United States Patent
Calcaterra et al.

(10) Patent No.: US 12,257,536 B2
(45) Date of Patent: Mar. 25, 2025

(54) HEAT ACTIVATED ADHESIVE FOR FILTERS THAT MAY CONTAIN MULTIPLE ELEMENTS

(71) Applicant: Baldwin Filters, Inc., Cleveland, OH (US)

(72) Inventors: Farrell F. Calcaterra, Kearney, NE (US); Charles Wick, Pleasanton, NE (US); Simon Ritchie, Kearney, NE (US); David Duryea, Franklin, TN (US)

(73) Assignee: Baldwin Filters, Inc., Cleveland, OH (US)

( * ) Notice: Subject to any disclaimer, the term of this patent is extended or adjusted under 35 U.S.C. 154(b) by 73 days.

(21) Appl. No.: 17/889,566

(22) Filed: Aug. 17, 2022

(65) Prior Publication Data

US 2022/0387914 A1 Dec. 8, 2022

Related U.S. Application Data

(63) Continuation of application No. PCT/US2021/022961, filed on Mar. 18, 2021.

(Continued)

(51) Int. Cl.
*B29C 65/00* (2006.01)
*B01D 25/02* (2006.01)
(Continued)

(52) U.S. Cl.
CPC ............ *B01D 39/00* (2013.01); *B01D 25/02* (2013.01); *C09J 5/06* (2013.01); *C09J 7/35* (2018.01);
(Continued)

(58) Field of Classification Search
CPC . B29C 65/4815; B29C 65/4835; B29C 65/54; B29C 65/70
See application file for complete search history.

(56) References Cited

U.S. PATENT DOCUMENTS

| 5,211,846 A | 5/1993 | Kott et al. |
| 6,345,721 B1 | 2/2002 | Durre et al. |

(Continued)

FOREIGN PATENT DOCUMENTS

| DE | 4429490 A1 | 2/1996 |
| DE | 10153642 A1 | 7/2002 |

(Continued)

OTHER PUBLICATIONS

Donaldson Filtration Solutions; Donaldson P551005 Lube Filter; https://www.everythingtruckparts.com/products/donaldson-p551005, Known to the applicant on or before Mar. 21, 2020; 5 pages.

(Continued)

*Primary Examiner* — Philip C Tucker
*Assistant Examiner* — Nickolas R Harm
(74) *Attorney, Agent, or Firm* — Reinhart Boerner Van Deuren P.C.

(57) ABSTRACT

A filter element comprises one or more several tubular filter media element segments, which may be pleated filter media ring segments. One or more heat activated disks are used to connect each tubular filter media element segments together and/or to connect tubular filter media element segments with one or more end cap supports. The heat activated disks are solid in form for assembly with tubular filter media ring segment and then heat activated to bond with tubular filter media ring segments. Multiple end caps can be simultaneously bonded to one or more tubular filter media element segments if a filter stack assembly of component are heated (Continued)

together, such as in an oven. Filter media may also be simultaneously cured. Heat activated disks may be used as pleat stabilizers and/or for and/or as part of end caps.

28 Claims, 7 Drawing Sheets

Related U.S. Application Data

(60) Provisional application No. 63/076,597, filed on Sep. 10, 2020, provisional application No. 63/005,648, filed on Apr. 6, 2020.

(51) Int. Cl.
| | | |
|---|---|---|
| *B01D 39/00* | (2006.01) | |
| *C09J 5/06* | (2006.01) | |
| *C09J 7/35* | (2018.01) | |
| *C09J 163/00* | (2006.01) | |
| *C09J 175/04* | (2006.01) | |
| *B29C 65/48* | (2006.01) | |
| *B29C 65/54* | (2006.01) | |
| *B29C 65/70* | (2006.01) | |

(52) U.S. Cl.
CPC ............ *C09J 163/00* (2013.01); *C09J 175/04* (2013.01); *B01D 2201/127* (2013.01); *B01D 2201/291* (2013.01); *B01D 2239/083* (2013.01); *B29C 65/4815* (2013.01); *B29C 65/4835* (2013.01); *B29C 65/54* (2013.01); *B29C 65/70* (2013.01); *C09J 2301/304* (2020.08)

(56) References Cited

U.S. PATENT DOCUMENTS

| | | |
|---|---|---|
| 6,787,031 B2 | 9/2004 | Van Pelt et al. |
| 8,083,938 B2 | 12/2011 | Lepine et al. |
| 8,087,517 B2 | 1/2012 | Schwinghammer et al. |
| 9,393,506 B2 | 7/2016 | Baumann et al. |
| 9,522,354 B2 | 12/2016 | Zurliene |
| D806,834 S | 1/2018 | Schweitzer et al. |
| 10,456,719 B2 | 10/2019 | Baumann et al. |
| 2012/0180444 A1 | 7/2012 | Nikolin et al. |
| 2015/0217218 A1 | 8/2015 | Caliendo et al. |
| 2017/0106317 A1 | 4/2017 | Stamey, Jr. et al. |

FOREIGN PATENT DOCUMENTS

| | | |
|---|---|---|
| DE | 10150273 A1 | 4/2003 |
| EP | 0781586 A2 | 7/1997 |
| JP | 2912407 B2 | 6/1999 |
| JP | 11285609 A | 10/1999 |
| JP | 2004290913 A | 10/2004 |
| JP | 2012024759 A | 2/2012 |
| KR | 20010016820 A | 3/2001 |
| KR | 20180124504 A | 11/2018 |
| WO | WO 2005082485 A1 | 9/2005 |

OTHER PUBLICATIONS

Hengst Filtration; Fluid management for HDEP engines from Daimler; https://www.hengst.com/en/business-divisions/vehicle-and-engine-filtration/fluid-management-filtration/commercial vehicles/oil-modules/fluid-management; Known to the applicant on or before Mar. 21, 2020; 3 pages.
Hengst Filtration; Hengst Online Catalogue; https://www.hengst.com/en/online-katalog/product/2783130000-01/na/; Known to the applicant on or before Mar. 21, 2020; 9 pages.
L & L Seal, Sealing Without Compromises; https://www.llproducts.com/products-solutions/ll:products-solutions-offerings/ll-seal/; Known to the applicant on or before Mar. 21, 2020; 6 pages.
Baldwin Filters; Baldwin—Lube Oil Filter Elements|#P7505; https://ph.baldwinfilters.com/baldwin/en/baldwin-lube-oil-filter-elements/p7505; Known to applicant on or before Mar. 21, 2020; 2 pages.
Changsha Eucrown Automobile Parts Co., Ltd; Mercedes-Benz MP4 Truck Air Filter A4721800109, A4721840225; http://eucrownparts.en.gasgoo.com/auto-products/1592266.html; Known to applicant on or before Mar. 21, 2009; 3 pages.
Ruian Top Filtrations Auto Parts Co., Ltd; Detroit Diesel Engine Freightliner Heavy Truck Oil Filter A472180010 E510H07D129 LF17511 HU12001z P551005 Oil Filter; https://www.topfiltrations.com/product/Detroit-Diesel-Engine-Freightliner-Heavy-Truck-Filter-Oil-Filter-A4721800109-E510H07D129-LF17511-HU12001z-P551005-Oil-Filter.html; Known to applicant on or before Mar. 21, 2020; 7 pages.
L&L Reinforce; L-5920 High expandable structural foam; www.llproducts.com; Feb. 2019; 2 pages.
L&L Reinforce; L-5905 High expandable structural foam; www.llproducts.com; May 2019; 1 page.
L&L Seal; L-3032F Non-expandable, paintable, hot melt sealant; www.llproducts.com; Apr. 2019; 2 pages.
Thermoset vs Thermoplastic Materials: Key Differences; https://hmroyal.com/blog/thermoset-vs-thermoplastic-materials-key-differences/; Dec. 14, 2023.
Comparing Thermoplastic Elastomers and Thermoset Rubber; Jeffrey Jansen; https://madisongroup.com/wp-content/uploads/2022/09/Jansen-TPE-Rubber-Article.pdf; Apr. 2016.
Thermosetting polymer; https://en.wikipedia.org/wiki/Thermosetting_polymer; retrieved Sep. 18, 2024.
Nitrile rubber; https://en.wikipedia.org/wiki/Nitrile_rubber; retrieved Sep. 18, 2024.
William F. Smith & Javad Hashemi, *Foundations of Materials Science and Engineering* 518-603 (7th ed. 2023).
Supplemental European Search Report; 8 pages; Jun. 28, 2024.

HEAT ACTIVATED ADHESIVE FOR FILTERS THAT MAY CONTAIN MULTIPLE ELEMENTS

This patent application is a continuation of U.S. PCT Patent Application No. PCT/US2021/022961, filed Mar. 18, 2021, the entire teachings and disclosure of which are incorporated herein by reference thereto. This patent application claims the benefit of U.S. Provisional Patent Application No. 63/076,597, filed Sep. 10, 2020, and U.S. Provisional Application No. 63/005,648, filed Apr. 6, 2020, the entire teachings and disclosure each of which are incorporated herein by reference thereto.

FIELD OF THE INVENTION

The present invention generally relates to pleat stabilizing methods for pleated filters, and/or end caps in filters and methods for providing the end caps, particularly for liquid filter applications.

BACKGROUND

Demanding liquid filtration applications require pleat stabilization. If pleats are not stabilized, they could blind off, tear, or collapse in high flow or cold start situations where there is a significant pressure differential across the element.

Various types of pleat support stabilization methods exist. For example, this has been done on the upstream and/or downstream side of the filter medium using a mesh (metal or plastic) as may be disclosed in a PCT application published as WO 2005/082485 entitled "Media support screen arrangement for liquid filters".

Pleat stabilization has also been done using pleat stabilization beads (hotmelt or plastics). For example U.S. Pat. No. 6,787,031 entitled "Filter cartridge with strap and method" discloses a method of extruding uncured extrudate that is forced to deform in between adjacent pleats of the filtration media. Other methods of pleat stabilization including gluing of pleat tips to another material such as an outer porous wrapper or roving.

In addition to traditional methods, dividing an element into multiple segments can also stabilize pleats. For example, Hengst brand E510H07 D254 oil filter insert with gasket set available at https://www.hengst.com/en/online-catalog/search/?ctalog=na shows an example of an oil filter with three pleated ring segments with a top end cap, a bottom end cap and two intermediate end caps therebetween. Other examples of intermediate end caps are shown in U.S. Patent Publication US 2017/0106317 to Stamey; and U.S. Design Patent USD 806,834 to Schweitzer disclosing an end cap for a dual filter element.

For conventional end cap attachment, liquid adhesive potting materials used in filter elements are typically thixotropic or self-leveling in nature. The liquid adhesive must be dispensed into the end cap and allowed to cure or solidify with the use of heat or a chemical reaction.

Liquid adhesives can easily be dispensed on one side of an end cap. For an end ring that requires liquid adhesive on both sides, dispensing such an adhesive can be problematic. Self-leveling adhesives will run out of the end ring when it's inverted, while thixotropic adhesive can come out when the material is dispensed into the second side, creating a mess. To avoid this, multiple potting and curing steps are necessary which results in multiple passes through a process and ultimately, additional process capacity being consumed.

End caps typically seal with the filter media pack to prevent unfiltered bypass. As disclosed in U.S. Pat. No. 8,083,938 adhesive agent is used to secure the filter media in an annular well of the end cap. The adhesive agent is disclosed as a plastisol or polyurethane foam that also seals the junction with outer sidewall to prevent fluid leakage therebetween, and it is also disclosed that the filter media could be directly embedded into the end caps. As an example of a direct embedded filter media, European Patent EP 781,586 to Mahle Filtersysteme Gmbh entitled "Ring filter insert" discloses that a filter unit that is a paper star body, with the ends embedded in the plastics material of the end discs. Other examples may be shown in U.S. Patent Nos. 9,393,506 or 10,456,719 to Baumann.

Use of solidified heat-activated potting adhesive has also been proposed, where the media is located against a solid adhesive and is then heated to soften it, and allow the media to embed into the adhesive as disclosed in U.S. Pat. No. 9,522,354 to Zurliene entitled "Filter Assemblies and Methods for Producing Filter Assembles". As disclosed in the '354 patent, the process involves providing or forming a composite sheet, which typically is done by applying liquefied plastisol or other heat liquefied adhesive to a surface of a sheet metal and allowing the adhesive to solidify and adhere to the metal sheet to form the composite sheet. An end cap can be stamped from the composite sheet. The method involves placing a filter media into physical contact with the adhesive typically within a channel defined by the walls of the filter cap. In the next step heat is applied to the filter cap to liquefy the adhesive and adheres the filter media to the first filter cap. Next, a second filter cap is placed into contact with the adhesive and heat is applied to the filter cap to liquefy or otherwise activate the adhesive of the second filter cap.

BRIEF SUMMARY OF THE INVENTION

A filter element and its assembly method can utilize an adhesive that is manufactured in a predetermined solid shape (for example a disk such as a flat annular ring) rather than poured as a liquid.

Utilizing a heat-activated adhesive that is solid can prevent the adhesive from running down during assembly and reduces multiple passes through an oven, thereby freeing up production capacity and lowering the overall cost of the filter.

A heat activated adhesive may also replace a double-sided end cap in the middle of a multi-element filter, which consolidates two adhesives quantities into one, thereby lowering material cost.

In accordance with an aspect, a method of manufacturing a filter element comprises placing at least one heat activated disk between ends of two tubular filter media element segments; and heating the at least one heat activated disk and embedding the two tubular filter media element segments therein.

In accordance with another aspect, a method for making a filter element comprises providing a ring of filter media having co-axially arranged element segments, and locating an end ring between two adjacent element segments, the end ring comprising i) an outer sleeve closely surrounding an outer periphery of media ring and overlapping a portion of each adjacent segment; and ii) one or more heat-activated adhesive disks, supported internally within the outer sleeve; and heating the one or more disks to adhesively secure the adjacent segments of the media ring together.

In accordance with another aspect, a method of manufacturing a filter element, comprises: arranging at least one filter media element segment in contact with at least one composite end cap, each composite end cap comprising an annular support of a first material having opposite sides and a second material along at least a first side of the opposite sides, the second material only partially covering the first side with at least one end of the at least one filter media element segment abutting the second material; and heating the second material to soften the second material and embed the at least one filter media element segment into the second material.

Yet another aspect is directed toward a method of manufacturing a filter element, comprising: arranging at least one filter media element segment between at least two heat activated disks with the heat activated disks in spaced relation and with the at least one filter media element segment abutting the heat activated disks; and simultaneously heating the at least two heat activated disks to concurrently embed the at least one filter media element segment into the at least two heat activated disks.

Several structures, features or additional aspect or processes may be used in any of the aspects above such as those detailed below that may be used separately and/or in combination with each other.

The method can be used to make a pleated filter element of one or more pleated filter media ring segments. For example, the two tubular filter media element segments may comprise pleated filter media ring segments stacked upon each other in spaced end to end and coaxial relationship to provide a stack.

In a pleated filter element example, each pleated filter media ring segment may have an outer diameter of between 1 and 10 inches (more preferably between 2 and 6 inches and most preferably between 3 and 4.5 inches), and an axial length of between 1 and 40 inches (more preferably between 2 and 20 inches and most preferably between 4 and 11 inches). When multiple pleated filter media ring segments are used, the heat activated disk can provide for pleat stabilizing of the pleated filter element.

Typically, the method also comprises capping opposite ends of the stack with top and bottom end caps.

For pleat stabilization, the method may comprise stacking at least three of the pleated filter media ring segments in adjacent end to end relation, While other materials are possible, examples of the at least one heat activated disk may comprise at least one of an epoxy, a urethane and a hot-melt.

According to a preferred method, heating comprises subjecting the at least one heat activated disk and the two tubular filter media element segments to heating in an oven for at least 5 minutes (more preferably at least 10 minutes, and most preferably at least 25 minutes).

An alternative heating method comprises use excitable material (such as metal particles) contained in the at least one heat-activated disk, wherein the heating can comprise exciting by an induction coil to at least partially melt the at least one heat activated disk.

In the method, the at least one heat activated disk can be placed is placed at a placement temperature of less than 50 degrees Celsius (typically room temperature) such that the at least one heat activated disk comprises a preformed solid disk at the placement temperature. During the heating, the heating softens the heat activated disk to a temperature that is at least 93 degrees Celsius (more preferably at least 105 degrees Celsius).

In conducting the method, each heat activated disk can comprise a preformed ring having a central opening including the following dimensions: an axial thickness of between 0.5 and 8 millimeters (more preferably between 1.5 and 2.5 millimeters); an inner diameter of the central opening of between 1.3 and 13 centimeters (more preferably between 0.75 and 7.5 centimeters); and an outer diameter of the preformed ring of between 2.5 and 25 centimeters (more preferably between 5 and 15 centimeters).

While in some embodiments, one heat activated disk may be used, preferably a plurality of the at least one heat activated disk are placed between the ends of the two tubular filter media element segments.

The method may use an intermediate end cap support of a different material than the at least one heat activated disk. The intermediate end cap support can comprise seating surfaces on opposite sides, with each seating surface having thereon at least one heat activated disk to provide a composite intermediate end cap.

The method may employ a sleeve of a different material than the at least one heat activated disk supporting the at least one heat activated disk for placement between the ends of the two tubular filter media element segments. The method may further comprise locating the sleeve over outer peripheries of the two tubular filter media element segments when placing the at least one heat activated disk between the ends of the two tubular filter media element segments.

In some filters, a support core may be used that can be embedded into the one or more heat activated disks. For example, the method may involve arranging two support core segments for the two tubular filter media element segments, and embedding the support core segments with the two tubular filter media element segments into the at least one heat activated disk.

The heat activated disk may be of a first material that is supported by a second material to provide a composite end cap.

For example, the first material may comprise a plastic material (or alternatively metal material) and the second material be a heat-activated adhesive material. For example, the plastic material (or alternatively metal material) can remain solid during the heating and wherein the second material is integrally bonded to the plastic material only after said arranging and from said heating.

For example, the second material can comprise at least one of an epoxy, a urethane and a hot-melt.

The heat activated disk may be of a first material that is supported by a second material to provide a composite end cap with an overmold arrangement. For example, the first material can comprise a plastic material with the second material is overmolded upon the plastic material and thereby integrally bonded to the plastic material prior to the heating.

One or more annular supports may be used for the one or more heat activated disks.

For example, the annular support can be in the form of an open intermediate end cap support having first and second annular seating surfaces on opposite sides and wherein the second material covers each of the first and second annular seating surfaces, and wherein the at least one filter media element segment comprises first and second pleated filter ring segments that are embedded into the second material along opposite sides of the intermediate open end cap support during the heating.

Preferably, the at least one composite end cap comprises at least two composite end caps in spaced relation arranged upon opposite ends of the at least one filter media element segment and simultaneously heating at least two composite end caps to concurrently embed the at least one filter media element segment into the at least two composite end caps. For example, such composite end caps may include a top end cap, a bottom end cap and/or one or more intermediate end caps.

The method may involve subjecting a filter assembly to an oven and simultaneously curing filter media of the at least one filter media element segment during the subjecting of the filter assembly to the oven.

The method may involve weighting a filter assembly comprising the at least one filter media element segment in contact with the at least one composite end cap to apply a force to apply an axial compressive force to the filter assembly that is at least 1 pound of force, and releasing the weighting after the at least one filter media element segment is embedded in the at least one composite end cap.

The heat activated disk may be of a first material that is supported by a second material (such provided by an annular support) to provide a composite end cap. The second material can retained upon the annular support upon arranging by a retaining means other than integral bonding of the second material. For example, the retaining means can comprise at least one of press fit, friction fit, separate adhesive other than the second material, mechanical connection, and being removably sandwiched between the support and the at least one filter media element segment.

Simultaneous heating may be provided by subjecting a filter assembly to an oven to simultaneously heat at least two heat activated disks, in which the filter assembly includes at least two heat activated disks with the heat activated disks in spaced relation.

In some examples, the method further comprises simultaneously curing filter media of the at least one filter media element segment during the subjecting of the filter assembly to the oven.

Preferably, at least two heat activated disks are provided by composite end caps, each composite end cap comprising an annular support of a first material and a second material, each of the heat activated disks being of the second material, wherein during the simultaneous heating the second material is softened and the at least one filter media element segment is only embedded into the second material. For example, the first material may comprise a plastic material (or a metal material) and the second material is a heat-activated material that comprises at least one of an epoxy, a urethane and a hot-melt, wherein the plastic material (or metal material) remains solid during the heating.

The method may be used for pleat stabilization and/or multiple filter media element segments, with the at least one filter media element segment comprising at least two pleated filter media ring segments arranged coaxially; and with the at least two heat activated disks comprising at least one intermediate disk arranged between adjacent pairs of the at least two pleated filter media ring segments and top and bottom end disks at opposite ends of a stack of the at least two pleated filter media ring segments. The top and bottom end disks provide entirely or at least in part top and bottom end caps, with the at least one intermediate disk providing an intermediate end cap with a central opening therethrough.

Other aspects are directed toward a filter element that may be produced by any of the methods above.

An aspect is also directed toward a filter element, comprising: a plurality of tubular filter media element segments including adjacent segments stacked in end to end relation; with at least one heat activated disk arranged between adjacent segments adhesively bonding and connecting the adjacent segments together.

The tubular filter media element segments may comprise pleated filter media ring segments stacked upon each other in coaxial relationship with the at least one heat activated disk therebetween.

The at least one heat activated disk may comprise a plurality of heat activated disks.

The filter element may comprise at least three pleated filter media ring segments in adjacent end to end and coaxial relation to provide a stack of the pleated filter media ring segments that is capped at opposite ends by top and bottom end caps. At least two of the heat activated disks in spaced relation axially separate the at least three pleated filter media ring segments, with each heat activated disk having embedded therein at least one of the pleated filter media ring segments.

The top end cap can be bonded on one side to one of the pleated ring segments with a top exposed face on an opposite side free of any filter media; and the bottom end cap is bonded on one side to one of the pleated ring segments and bottom exposed face on an opposite side free of any filter media. Each of the top and bottom end caps may be composite end caps comprising a plastic cap support and a heat activated disk.

The at least one heat activated disk can provide a pleat stabilizer between a plurality of pleated filter media ring segments, wherein the two tubular filter media element segments are provided by two of the pleated filter media ring segments.

The at least one heat activated disk may comprise at least one of an epoxy, a urethane and a hot-melt.

The filter element may comprise an intermediate end cap support of a different material than the at least one heat activated disk. The intermediate end cap support comprises seating surfaces on opposite sides and a central opening communicating fluid internally between adjacent segments, with each seating surface having thereon at least one heat activated disk to provide a composite intermediate end cap.

The filter element may comprise a sleeve of a different material than the at least one heat activated disk supporting the at least one heat activated disk for placement between the ends of the two tubular filter media element segments, with the sleeve located over outer peripheries of the two tubular filter media element segments.

For example, the sleeve may be part of a more conventional end cap having a seating disk portion for the heat activated disk and/or may support the heat activated disk directly.

For example, the heat-activated adhesive disk can be supported around its periphery by the sleeve.

Another aspect that may be produced by the methods above and/or include features or structures above is a filter element, comprising: (a) a ring of filter media having co-axially arranged element segments, and (b) an end ring between two adjacent element segments, the end ring comprising i) an outer sleeve closely surrounding an outer periphery of media ring and overlapping a portion of each adjacent segment; and ii) one or more heat-activated adhesive disks, supported internally within the outer sleeve, and located between and against adjacent ends of the element segments.

The heat-activated adhesive disk may be supported around its periphery by the sleeve.

The end ring may include a center section (e.g. a disk support portion), with an adhesive disk is provided against opposite surfaces of the center section and a respective end of the element segments.

A single heat activated disk may be adhesively secured directly to adjacent ends of the element segments.

The end ring may include a center section (e.g. a disk support portion), and an adhesive disk is provided against opposite surfaces of the center section and a respective end of the element segments.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1A:
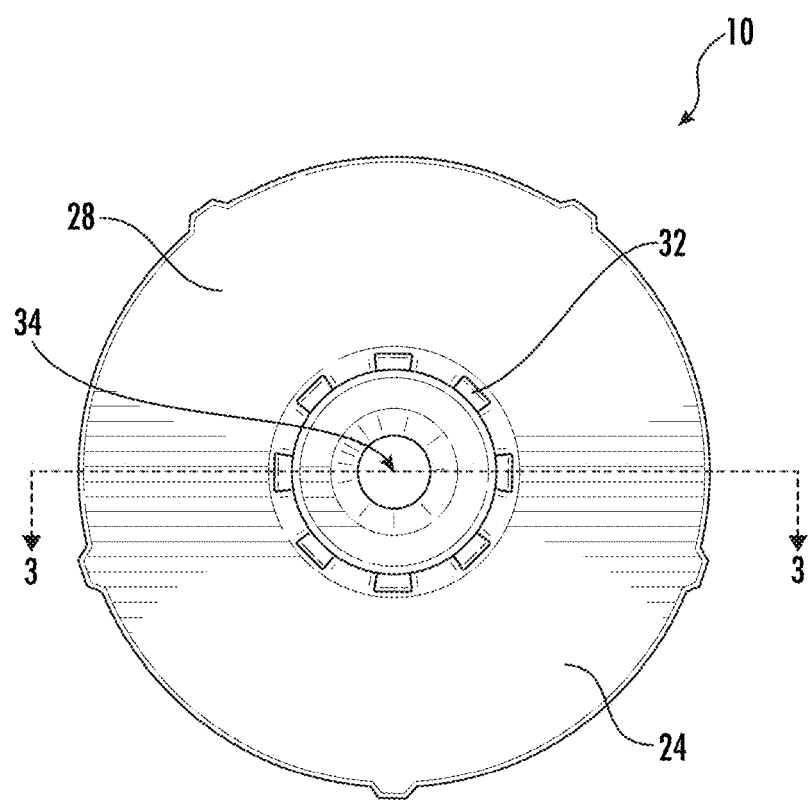
FIGS. 1A and 1B are top and bottom end views of a filter element in accordance with an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to FIGS. 1A to FIG. 3, an embodiment of the present invention has been illustrated as a filter element 10, comprising at least one and typically multiple tubular filter media element segments as illustrated that are preferably each in the form of a pleated filter media ring segment 12; and at least one and typically multiple heat activated disks 14.

For shorter filter elements a single pleated filter media ring segment 12 may be utilized, however the illustrated embodiment employs at least two and in this case three pleated filter media ring segments 12, although more pleated filter media ring segments 12 may be used for longer filter applications and/or more robust pleat stabilization.

Pleated filter media ring segments are preferred, which comprise a porous sheet of filter media containing cellulose and/or polymeric fibers (and/or optionally curable resin) which are pleated and then wrapped into a ring with opposed edges joined and/or fastened together. This provides for an unfiltered side (e.g. typically radially outside and circumferentially around the ring and a filtered side, which is typically within a central filter chamber 16 surrounded by the one or more pleated filter media ring segments 12. Optionally, other types of filter medias may be used such as depth medias or others and the broader term tubular filter media element segment(s) are meant to encompass other forms in addition to pleated filter media ring segment(s).

A plurality of tubular filter media element segments can be employed to provide a longer pack with more filtration capacity, in which adjacent filter media element segments 12 are stacked in end to end and co-axial relation to provide a filter stack 18. These can be connected by one of more heat activated disks 14 to secure the filter stack 18 together.

As illustrated, at least one heat activated disk 14 is arranged between adjacent filter media element segments 12 adhesively bonding and connecting the adjacent segments together. For example, in the embodiment of FIG. 3 (see also FIG. 4), two of the adhesive disks 14 are used for this purpose; however for example in FIGS. 6 and 7 as well as in FIG. 8, a single heat activated disk 14 may be used in an intermediate end cap.

When used for an open end cap purposes, preferably each heat activated disk 14 is in the shape of a circular ring 20 defining a central opening 22. However, closed end caps are contemplated as well (e.g. the bottom end cap could be a closed end cap for example), in which at least one heat activated disk 14 may be in the form of a plate without a central opening.

The heat activated disks 14 are preferably flat before assembly to better initiate abutting contact for adhesive attachment and sealing attachment during heating, and remain flat after assembly and after heat application in which the filter media embeds therein.

The one or more pleated filter media ring segment(s) 12 are also capped at opposite ends by top and bottom end caps 24 and 26.

The top end cap 24 is bonded on one side to uppermost pleated filter media ring segment 12 with a top exposed face 28 disposed on an opposite side. The top exposed face 28 free of any filter media (i.e. is not bonded to filter media). Similarly, the bottom end cap is bonded on one side to the lowermost pleated filter media ring segment 12 with bottom exposed face 30 on an opposite side. The bottom exposed face 30 is also free of any filter media.

The "top" end cap is ordinarily considered to be that end of the filter that mounts to a filter head such as with mounting prongs 32 and/or defines an fluid port (in this case outlet port 32) for return of fluid. However, the filter can be mounted in any orientation and upside down with the end cap 24 still considered the "top end cap" and the bottom end cap 26 still considered the "bottom end cap" even if the filter element 10 is upside down when in use. The bottom end cap may be closed end cap without any opening or in this application may include an opening 36 (potentially surrounded by annular gasket 37) as well and thereby also an open end cap, such as for a sump port or to seal to a centering projection of a mounting bowl, or for another reason.

Preferably, each of the top and bottom end caps 24, 26 are composite end caps comprising a metal or plastic support member and a heat activated disk. By composite end cap, it is meant that two different materials are used (e.g. two different types of plastics including one that heat activates to soften at a lower temperature; and/or more preferably a separate heat activated disk that may be placed upon a plastic support and heat bonded thereto during heat processing of a stacked filter assembly). In such a composite end cap prior to assembly and embedding with the pleated filter media ring segments 12, it is not necessary for the two different materials to be bonded to each other, although they may be bonded prior to such assembly.

Each of the top and bottom end caps 24, 26 being composite end caps comprise a plastic support cap 42, 44 and a heat activated disk 24. The plastic support caps 42, 44 define annular wells providing seating surfaces 46, 48 upon which the heat activated disks 14 can be placed and located.

By "composite end cap", it is meant to include the caps both before heat application and after heat application. In some embodiments, the composite end cap initially has the activated disk 24 not yet bonded to the plastic support cap, while in other embodiments the heat activated disks may be pre-bonded such as through a different material adhesive (e.g. a tab of glue) or the disk heated or spot welded along one side for initial bonding as an assembly aid.

Figure 8:
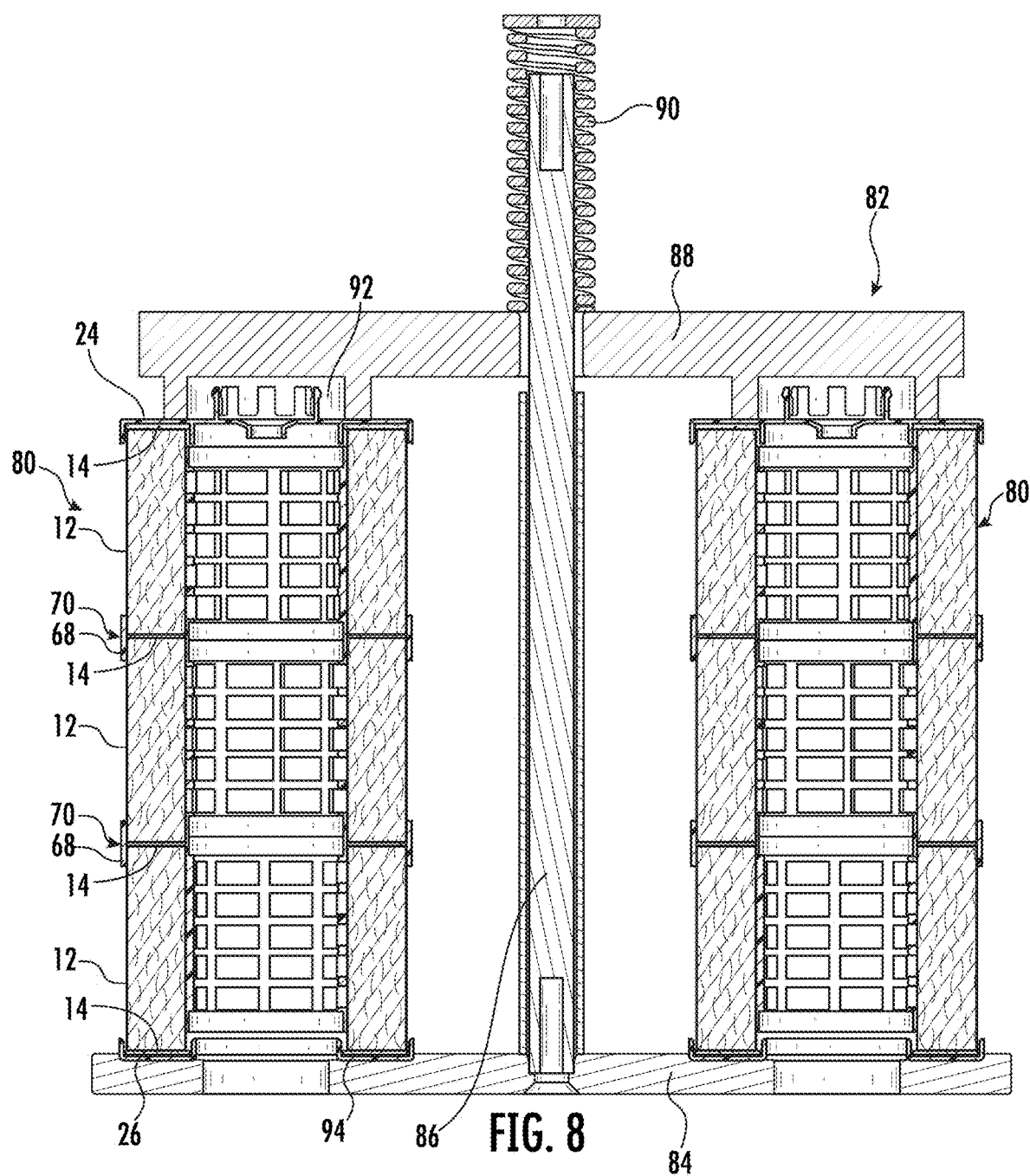
FIG. 8 is a cross section illustration of filter elements during assembly and before heating along with a weighting fixture used to create the filter element shown in FIG. 3, but slightly modified by using the alternative composite intermediate end cap if FIG. 6 in place of the composite end cap shown in FIG. 4, it being understood that end caps of FIGS. 4 and 6 are interchangeably useable in the filter element in the illustrated figures.

For example, the composite end caps (e.g. top and bottom end caps 24, 26) are shown in FIG. 8 prior to heat application in which the heat activated disks 24 are not yet bonded to the plastic support caps 42, 44, but retained thereon by retaining means. Examples of retaining means include a press fit or friction fit of the disks into the support, separate adhesive other than the heat activated adhesive material of the heat activated disks 14, a spot weld of the heat activated disks, a mechanical connection, gravity, and being removably sandwiched between the support and the at least one filter media element segment (e.g. that is needed if placed on an upward facing side of a pleated filter media ring segment).

Figure 5:
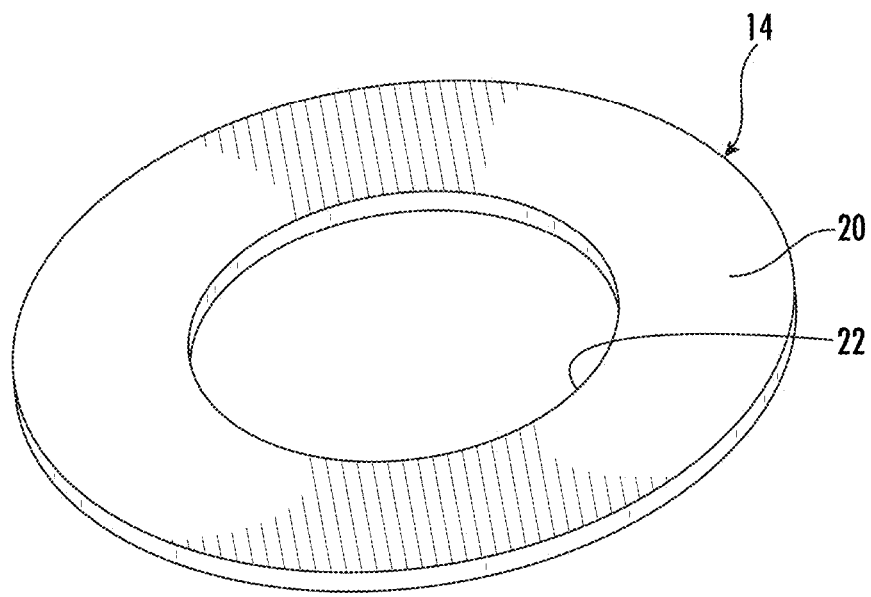
FIG. 5 is an isometric view of a heat activated adhesive disk useable in embodiments of filter elements.

The same heat activated disk 14 as shown in FIG. 5 can be used for all of the different end caps employed such that a common part component may be used universally, reducing the number of different parts needed for assembly.

Preferably, each heat activated disk comprises at least one of an epoxy, a urethane and a hot-melt. For example each heat activated disk may be formed from a heat-activated adhesive by L&L Products (of West Columbia, SC, USA and/or Romeo, MI, USA) sold under product designations L-5905 or L-5920 epoxies.

The heat activated disk 14 in the present embodiment is also used as an intermediate end cap and/or pleat stabilizer between a plurality of pleated filter media ring segments 12.

Preferably, and as shown, when used as a pleat stabilizer and/or intermediate end cap, the heat activated disk 14 is part of an intermediate composite end cap 50. The intermediate composite end cap 50 comprises an intermediate end cap support 52 is a double sided end cap with annular wells 54 on both sides. For example, annular wells 54 can be provided by a ring shaped disk 56 with an outer and inner cylindrical walls 58, 60 rising above and below the ring shaped disk 56. These provide opposite side seating surfaces 62, 64 upon which the heat activated disks 14 can be placed and located.

Seating surfaces 62, 64 are annular receiving locations that are preferably flat on either side of the end caps.

Top and bottom end caps 24, 26 including similar seating surfaces, however, typically only one seat surface for the top end cap 24 and one seating surface for the bottom end cap, as illustrated.

Each seating surface 62, 64 of an intermediate end cap support has thereon at least one heat activated disk 14 to provide a composite intermediate end cap.

Retaining means may be used. For example, like the top and bottom end caps, retaining means may be used to keep the heat activated disks 14 on the seating surface 62, 64 during assembly and prior to heating. Examples of retaining means include a press fit or friction fit of the disks into the support, separate adhesive other than the heat activated adhesive material of the heat activated disks 14, a spot weld of the heat activated disks to the seating surface or one of the walls, a mechanical connection, gravity, and being removably sandwiched between the support and the at least one filter media element segment (e.g. that is needed if placed on an upward facing side of a pleated filter media ring segment).

The intermediate end cap support 52 (and/or the top and bottom end cap supports 42, 44) is of a different material than the heat activated disks 14 to withstand the heat and remain solid to provide support and/or not deform/warp in a way that would cause problems. To communicate the central filter chamber 16 for clean fluid therethrough to the outlet port 34, each intermediate end cap support 52 comprises a central opening 66 defined by the inner cylindrical wall 60, communicating fluid internally between adjacent segments.

Figure 6:
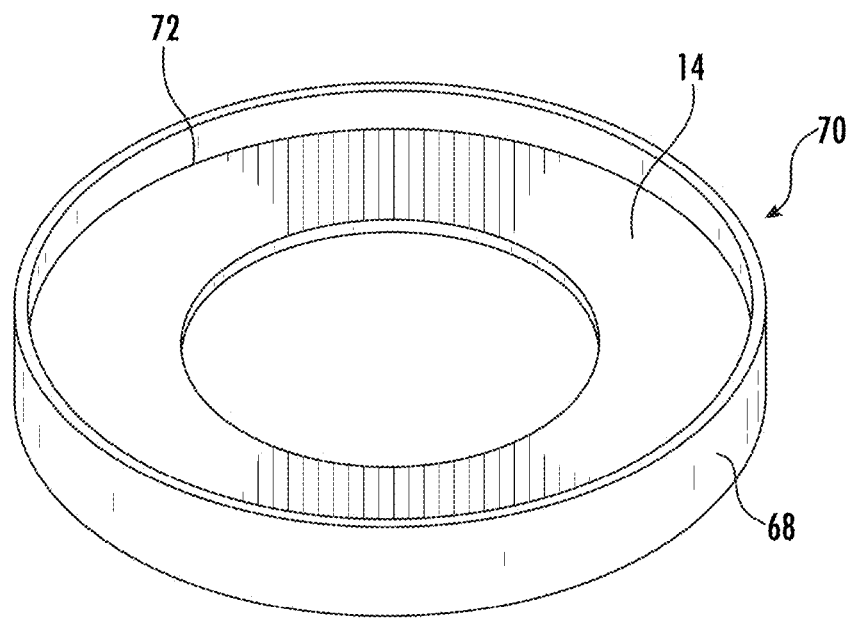
FIG. 6 is an isometric view of a composite intermediate end cap according to another embodiment that may be substituted for the composite intermediate end cap of FIG. 4 for use in alternative embodiments of a filter element.
Figure 7:
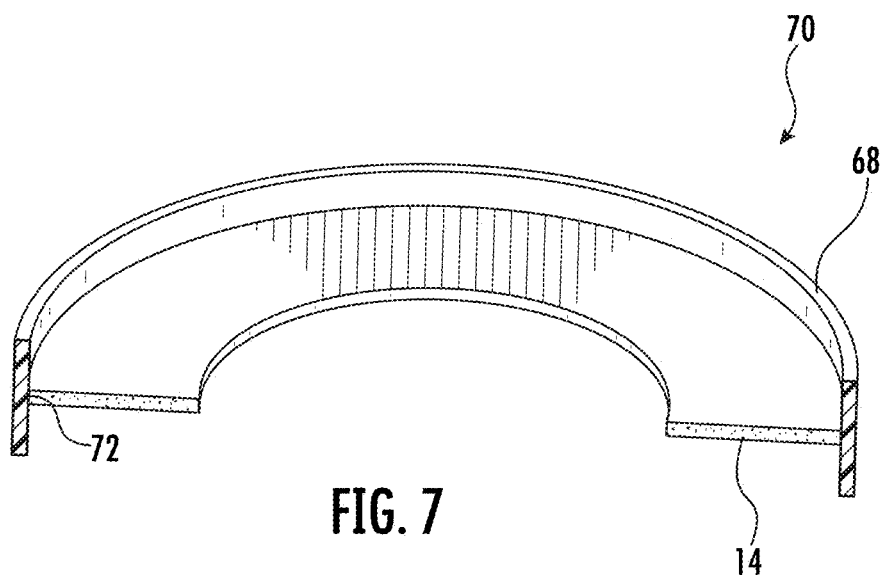
FIG. 7 is a cross section of the composite intermediate end cap shown in FIG. 6.

The intermediate end cap support may alternatively take the form of as sleeve 68 to provide an alternative embodiment of an intermediate composite end cap 70, as shown in FIGS. 6-8. Like the first embodiment of FIGS. 1-4, the sleeve 68 is a support and is of a different material than the at least one heat activated disk 14. The sleeve 68 supports the at least one heat activated disk 14 for placement and assists in location and alignment between the ends of the pleated filter media ring segments 12. The sleeve 68 is optional for an intermediate end cap but serves as an assembly aid to locate and support over outer peripheries of pleated filter media ring segments 12 when placing the heat activated disk 14 between the ends thereof.

Retaining means may be used to secure the heat activated disk 14 to the sleeve 68. Examples of retaining means include a press fit or friction fit of the disks into the sleeve 68, separate adhesive other than the heat activated adhesive material of the heat activated disks 14, a spot weld of the heat activated disks to the inner periphery of the sleeve support, a mechanical connection (e.g. snap fit, stop projection such support tabs projecting inward and/or groove formed on the inner periphery of the sleeve). In this embodiment the retaining means is a press and/or friction fit by way of contact interference 72 at the interface between the two components.

An advantage of this design of FIGS. 6-8 for the intermediate composite end cap 70 is that both sides of the heat activated disk 14 can be used to embed into two of the pleated filter media ring segments 12. In this design, two heat activated disks 14 could also be supported within the sleeve 68 rather than a single disk.

Optionally, additional support may be such as central support core that may comprise support core segments 74, one for each pleated filter media element segment 12.

The central support core can provide for radial support for the filter media (e.g. to resist inward fluid pressure when in use) and/or to provide axial support rigidity.

Ends of the support cores segments 74 may embed within two heat activated disks 14 on opposed ends, such as may be provided by two of the following: the top end cap 24, the bottom end cap 26, and/or an intermediate composite end cap 50. Additionally, or alternatively, the support cores segments 74 may telescopically interfit with radially engaging cap and core sleeve portions 74, 76.

To assemble the filter element 10, a method of manufacturing the filter element 10 is provided. In some embodiments, the heat activated disk 14 may only be used for a single end cap in the overall filter element, such as one of the top end cap 24, the bottom end cap 28, and the intermediate composite end cap 50 (or alternate intermediate composite end cap 70).

However, in the illustrated embodiment and advantageously, multiple end caps and more preferably all of the end caps (e.g. each of the top end cap 24, the bottom end cap 28, and the intermediate composite end cap 50 (or alternate intermediate composite end cap 70)) include a heat activated disk 14. In this manner, during a subsequent heating step more than one and preferably all end caps will be embedded into ends of the pleated filter media ring segments 12 at the same time.

Each heat activated disk 14 along each end cap is in a solid disk form (i.e. not fluid form) prior to placement with the pleated filter media ring segments 12.

Advantageously, no liquid dispensing needs to occur and the heat activated disk 14 can be tilted or placed upside down without concerns about adhesive escaping due to fluid movement.

By employing disks, which are preferably annular rings for the heat activated disks 14, less adhesive material may need to be employed and a targeted region of the end caps covered. The adhesive material may therefore only partially cover a side of an end cap support to abut a pleated filter media ring segment abutting the second material.

Each composite end cap (e.g. top end cap 24, bottom end cap 26, and intermediate composite end cap 50 or 70) has an annular support of a first material (e.g. plastic or metal) that may either be a disk support and/or sleeve support having opposite sides with a second material (e.g. heat active adhesive of the heated activated disk 14) along at least a first side of the opposite sides. For example, for the top and bottom end caps 24, 26, only one side is covered (i.e. either the top or bottom side). For the first embodiment of the intermediate composite end cap 50 the heat activated adhesive material is on both top and bottom sides, provided by two heated activated disks 14; while in the second embodiment of the intermediate composite end cap 50 the radially inner side supports heat activated adhesive material of a heat activated disk 14, while the outer side is free of such adhesive material.

The heat activated disks 14 can be placed initially and if desired retained upon one of the end cap supports 42, 44, 52 or 68. Alternatively, individual components of the filter element 10 can be placed and stacked from bottom to top, with some heat activated disks 14 that may be initially places upon top of a pleated filter media ring segment 12 with an end cap then placed thereupon to provide a composite end cap.

In either event, each pleated filter media element segment 12 is arranged in contact with at least one composite end caps, and preferably two spaced apart composite end caps.

For example, as shown in FIG. 8, each filter media element segment 12 has opposite ends in abutting contact relation with different heat activated disks 14; with: (a) the top filter media element segment 12 having opposed ends abutting in contact with the heat activated disk 14 of the top end cap 24 and the heat activated disk 14 of the upper intermediate composite end cap 70, respectively; (b) the intermediate filter media element segment 12 having opposed ends abutting in contact with the heat activated disk 14 of the upper intermediate composite end cap 70 and the heat activated disk 14 of the lower intermediate composite end cap 70, respectively; and (c) the lower filter media element segment 12 having opposed ends abutting in contact with the heat activated disk 14 of the lower intermediate composite end cap 70 and the heat activated disk 14 of the bottom end cap 26, respectively.

This provides a filter assembly designated as an un-bonded filter stack 80 and illustrated in FIG. 8.

Optionally and preferably, weighting may also be added as shown in FIG. 8 prior to or during heating such as with a weighting fixture 82. This provides for weighting the un-bonded filter stack 80. For example, the weight fixture 82 may include a support base 84 for supporting one or more un-bonded stacks 80 (that after heating become filter elements 10); a vertical support rod 86 and a weighted slide 88 supported for vertical sliding movement upon the support rod and engaging over the top of the un-bonded stacks 80 to provide axial compression force. The weighting is provided by the weight of the slide 88 and/or optionally additional spring force provided by compression spring 90 that is retained upon the vertical support rod 86 and applies additional downward pressure to the slide 88 beyond the gravitational force acting upon the slide 88. For example, this may provide a weighting and axial compression force for at least one 1 pound weighted pressure upon each un-bonded filter stack 80, more typically between 5 and 25 pounds of axial compression force.

The slide 88 and/or the support base 84 may additionally have end cap receiving wells 92, 94 that receive top and bottom end caps 24, 26 for locating during assembly and/or maintaining alignment during subsequent heating.

Once the components of the filter element 10 are assembled into the un-bonded filter stack 80 (and optionally weighted and/or held in a fixture 82 if desired), then the unbonded filter stack 80 is heated such as in an oven. The heat activated adhesive material of the heat activated disks 14 is thereby softened to caused embedding of the one or more filter media element segments into the heat activated adhesive material of the heat activated disks 14.

The heat activated adhesive material of the heat activated disks 14 preferably is heat activated sufficiently to soften and allow embedding of the pleated filter media ring segments 14 at a temperature range of between 93 and 260 Celsius, more typically between 150 and 218 Celsius, which also thereby is preferably higher than the expected operating temperature of the filter element 10 in a typical fuel or oil filtration application for an engine. To provide for this, the oven may be at a temperature of between 93 and 260 Celsius, more typically between 150 and 218 Celsius, and the filter stack 80 may be subjected to the oven for a duration of between 5 and 35 minutes, more typically between 15 and 25 minutes.

The end cap support may be a plastic material or alternatively a metal material that in either case remains solid during the heating. If needed the heat activated adhesive of the heat activated disks 14 is integrally bonded to the plastic support material (or metal material) provided by one of the end cap supports only after being arranged in the stack and from the heating step. Alternatively, if the end cap support material comprises plastic material, the second material may be an heat activated overmold material having a substantially lower softening and/or melting temperature than the first plastic material that is overmolded upon the plastic support and thereby integrally bonded to the plastic material prior to the eventual heating which embeds the filter media into the end cap.

Figure 4:
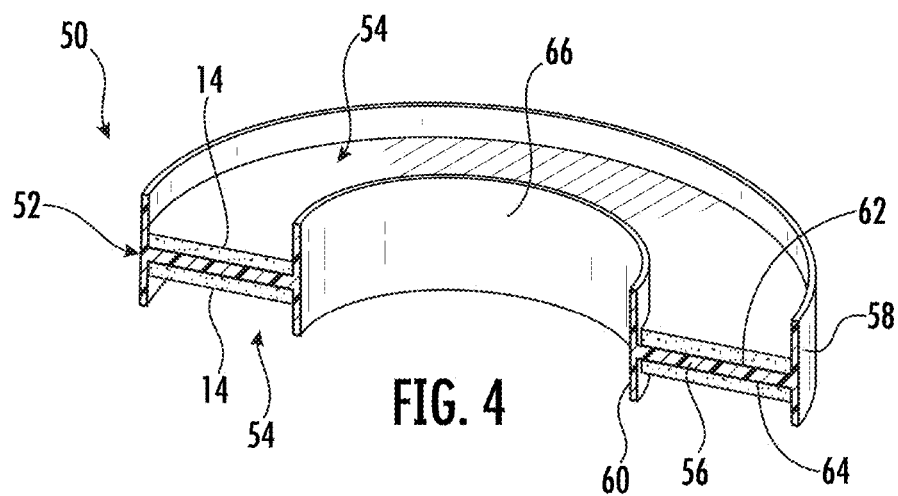
FIG. 4 is an isometric cross section of a composite intermediate end cap useable in the filter element of the previous figures.

Preferably and as illustrated each of the embodiments of intermediate end cap 50, 70 shown in FIGS. 4 and 7, includes an outer sleeve to provide for location and alignment with the pleated filter media ring segments 12, for example such a sleeve portion is provided by outer cylindrical wall 58 in FIG. 4 and the sleeve 68 in FIG. 7. Similarly the top and bottom end caps include downward or upward projecting sleeves to assist in alignment and location during stacking assembly. In either case, the sleeve serves the purpose to align the heat activated disks 14 during stacking of end caps and pleated filter media ring segments 12.

As illustrated in FIG. 8, none of the pleated filter media ring segments 12 are yet bonded to any of the end caps 24, 26, 70. In this filter stack 80, the assembly is ready to be heated such as by subjecting to an oven. When the entire filter stack 80 is heated such as via subjecting to an oven, simultaneously heating all of the end caps 24, 26, 70 occurs to concurrently embed all of the pleated filter media element segments 12 into the end caps 24, 26, 70. While it is possible to do piecemeal such as one or two end caps at a time, simultaneously doing several and preferably all end caps results in significant manufacturing efficiencies, time and therefore cost savings.

Further, some filter medias may include uncured resins that may be used to set pleat shape after pleating or need curing for other reasons. With the present process of subjecting to an oven, the same curing oven for the media can also be used to embed end caps. The oven curing temperature and time needed for curing the filter media is selected to be compatible with the temperature and time needed to soften the heat activated disks 14 to embed the one or more pleated filter media ring segments 12 into one or more end caps 24, 26, 50, 70.

While an oven is preferred, another option is provided excitable material (such as metal particles) contained in the soften-able adhesive material of the one or more heat-activated disk 14. Therefore, it is contemplated that an alternative type of heating may be done to one or more end caps for attachment to filter media. For example, heating may comprises exciting by an induction coil to excite metal particles (and thereby cause heating), to thereby at least partially melt the at least one heat activated disk to be fluid enough to allow embedding to occur.

Figure 1B:
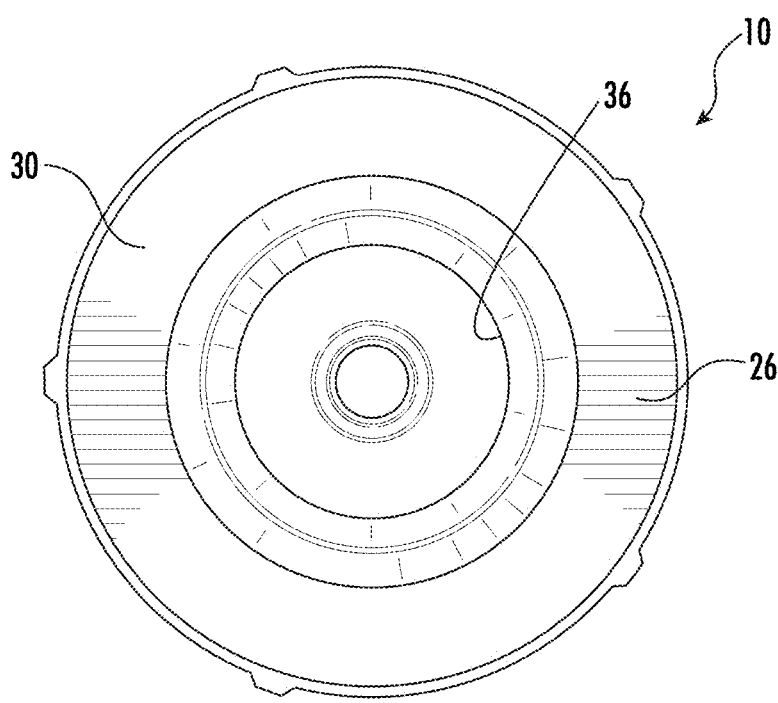
Figure 2:
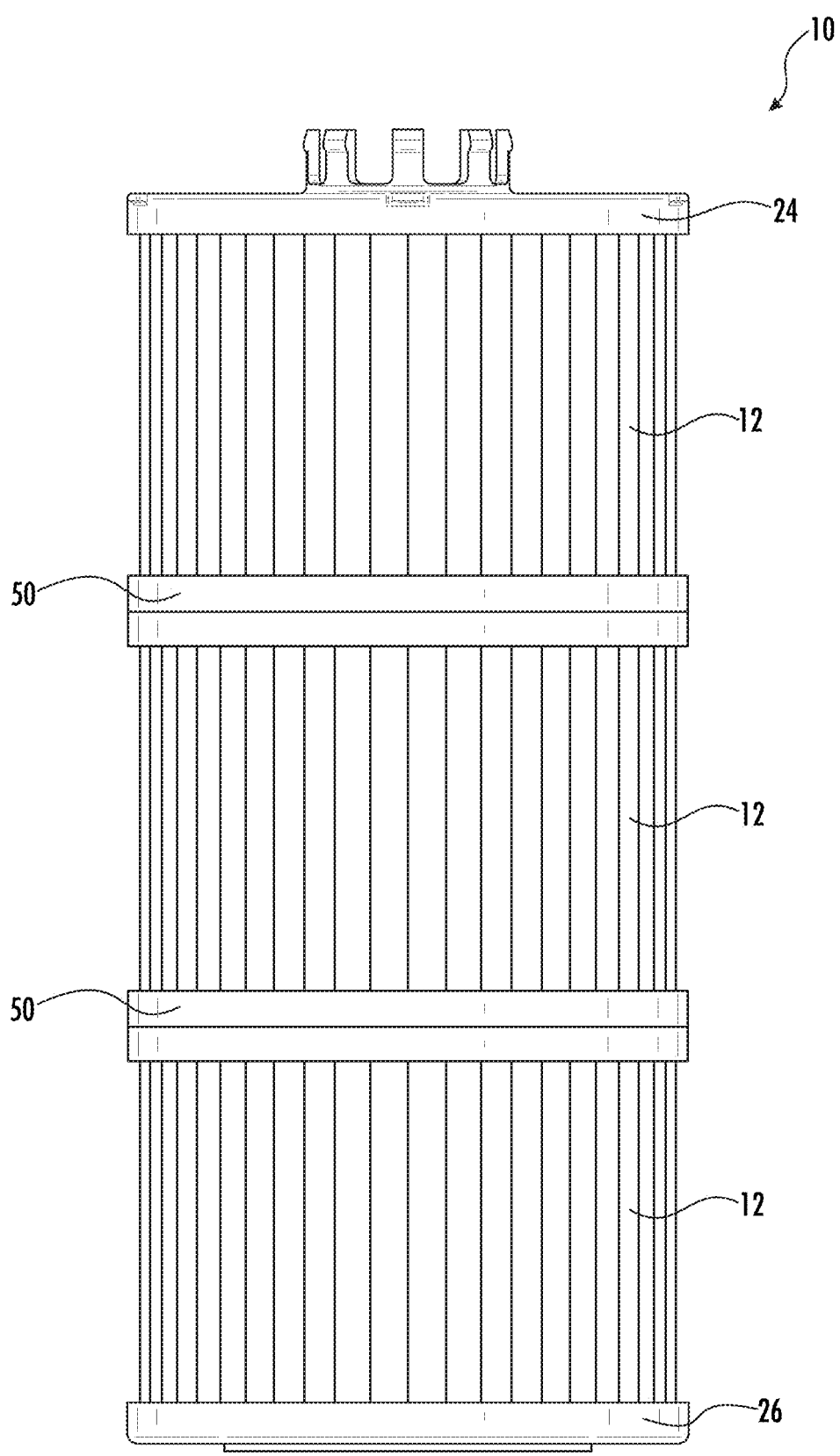
FIG. 2 is a side view of the filter element shown in FIGS. 1A and 1B.
Figure 3:
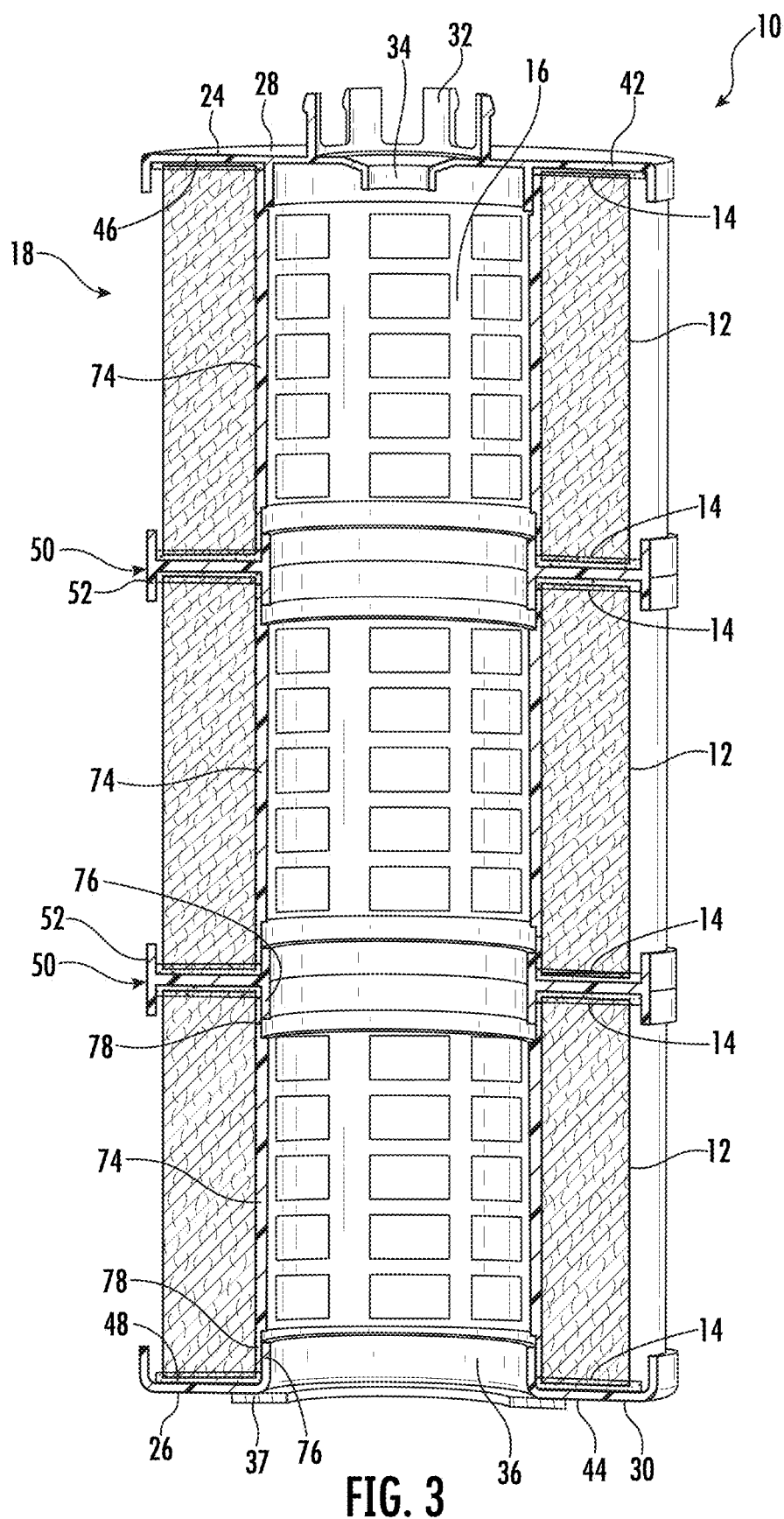
FIG. 3 is a cross section (and slightly isometric view from upper right hand) of the filter element with the cross section taken through line 3-3 of FIG. 1A.
Figure 9:
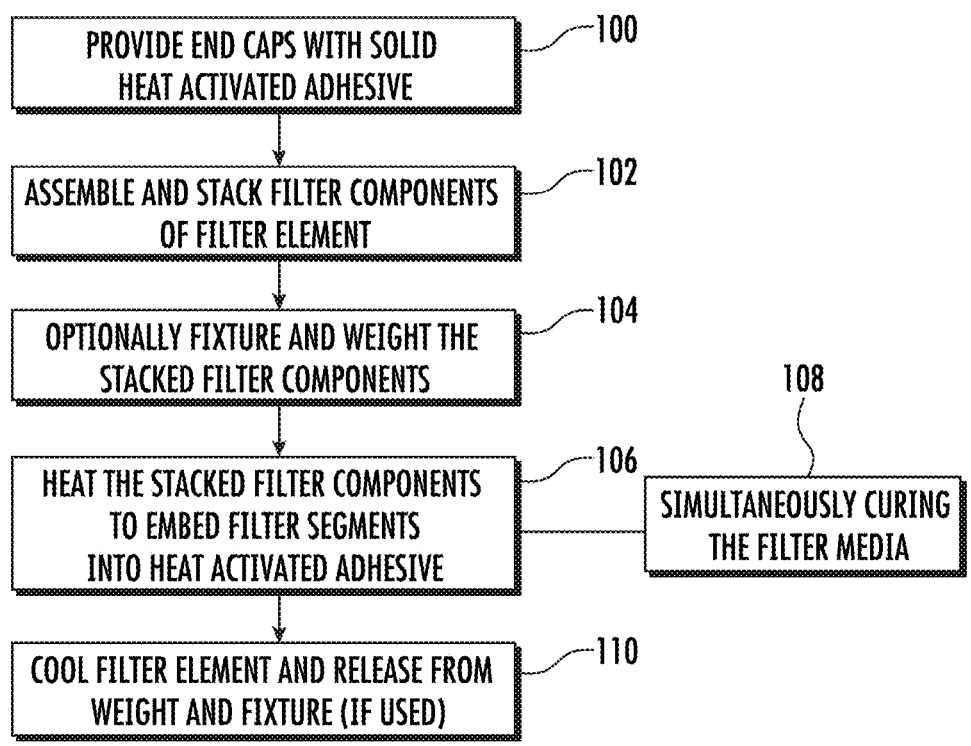
FIG. 9 is a method process diagram showing the steps in making a filter element according to embodiments herein.

Accordingly, from the foregoing it is seen that a process for making the filter element 10 is known and shown in the process flow diagram of FIG. 9, which comprises the sequential steps of: (a) providing end caps with solid heat activated adhesive 100; (b) assembling such as by stacking filter components of the filter element 102 (see also e.g. FIG. 8); (c) optionally fixturing and/or weighting the stacked filter component 104 (see also e.g. FIG. 8); (d) heating the stacked filter components to embed pleated filter media ring segments into the heat activated adhesive disks 106 (which may also simultaneously cure the filter media 108 (such as of pleated filter media ring segments 12); and (e) now that the filter media ring segments are embedded into heat activated disks, cooling the filter element and if fixtured/weighted also releasing from the weight and fixture 110. The result of such a process is used to create the filter element 10 as shown in FIGS. 1-3 with the pleated filter media ring segments embedded into heat activated disks to cap ends of the pleated filter media ring segments.

ADDITIONAL DISCUSSION, ADVANTAGES, SUMMARY AND CONCEPTS

Based upon the foregoing, various embodiments of the subject invention can utilize an adhesive that is manufactured in a predetermined solid shape, e.g., a flat annular ring, as shown in FIG. 5. Utilizing a heat-activated adhesive that is solid prevents the adhesive from running down during assembly and reduces multiple passes through an oven, thereby freeing up production capacity and lowering the overall cost of the filter. It can also replace a double-sided end cap in the middle of a multi-element filter, which consolidates two adhesives quantities into one, thereby lowering material cost.

In one embodiment for the filter element of FIGS. 1A-3, an adhesive disk is placed between the ends of the element and the end caps, as well as against the opposing surfaces of the intervening end ring(s) and adjacent ends of the element segments, before the media pack is installed.

After the filter has been assembled, it is placed into an oven where heat softens the material and bonds it to the media, the end caps and end ring(s), creating a fluid tight seal, thereby creating the filter element shown in FIG. 3. This allows an element of more than one segment to be assembled and processed through a single heating pass.

Because the adhesive is thixotropic in nature, once heat activates it, the media pack is pressed into the adhesive by gravity or some other mechanical means such as weighting in a fixture. The adhesive could be non-foaming or foaming. Foaming would be activated by heating to insure the material adequately bonds the media to the end cap.

An example of a heat-activated adhesive is L&L Products L-5905 or L-5920 epoxies.

Because the potting material requires heat to activate, it can be placed into a traditional convection oven similar to plastisol, taking advantage of existing processes. The heat from the convection oven not only activates the adhesive, it can be used to cure the pleated medium accomplishing two process steps simultaneously—similar to potting a filter with plastisol. However, for a filter with multiple elements, plastisol requires multiple passes through the convection oven because it is a liquid and it is messy. This is not a problem with a rigid material that softens after assembly.

Other examples and types of materials that are heat-activated that could be used in this way for the heat activated disks 14 include urethanes and hot melts.

In an alternate embodiment, a heat-activated adhesive could contain a material that is excited by an induction coil. Metal particles are such a material, but any material excited by an induction coil to produce heat could be used. As before, the adhesive could be an epoxy, urethane, or hot melt. A filter with this material is assembled and placed into a set of induction coils. These coils excite a material inside of the adhesive creating heat—similar to being placed into a convection oven. The heat activates the material and bonds the filter together in one process step. In this embodiment, the medium may require curing prior to activating the adhesive. However, it does not require large convection ovens to cure the material.

The invention can be used to assembly a cartridge filter used with a reusable housing or used in a single use spin-on filter.

In a second alternate embodiment, the adhesive disk replaces the center section of the end ring, as shown in FIGS. 6-8. This reduces the cost of the end ring. The material can be over-molded or snapped into an outer sleeve that is used to contain the material radially and which closely surrounds the outer periphery of the adjacent element segments to provide a visually-attractive finish to the filter.

In summary, the use of a heat-activated adhesive that is supplied to an assembly process in solid form allows for assembly of multiple filter packs in one process step. This in turn creates one-piece flow, eliminates mess associated with liquid adhesives, and frees up process capacity which is not possible with traditional liquid potting adhesives.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of manufacturing a filter element comprising:
    placing at least one heat activated disk between ends of two tubular filter media element segments; and
    heating the at least one heat activated disk and embedding the two tubular filter media element segments therein.

2. The method of claim 1, further comprising making a pleated filter element, wherein the two tubular filter media element segments comprise pleated filter media ring segments stacked upon each other in spaced end to end and coaxial relationship to provide a stack, each pleated filter media ring segment having an outer diameter of between 1 and 10 inches, and an axial length of between 1 and 40 inches, to provide for pleat stabilizing of the pleated filter element, further comprising capping opposite ends of the stack with top and bottom end caps.

3. The method of claim 2, stacking at least three of the pleated filter media ring segments in adjacent end to end relation.

4. The method of claim 1, wherein the at least one heat activated disk comprises at least one of an epoxy, a urethane and a hot-melt.

5. The method of claim 4, wherein the heating comprises subjecting the at least one heat activated disk and the two tubular filter media element segments to heating in an oven for at least 5 minutes.

6. The method of claim 4, further comprising excitable material contained in the at least one heat-activated disk, and wherein said heating comprises exciting by an induction coil to at least partially melt the at least one heat activated disk.

7. The method of claim 1, wherein the at least one heat activated disk is placed at a placement temperature of less than 50 degrees Celsius such that the at least one heat activated disk comprises a preformed solid disk at the placement temperature, and wherein the heating softens the heat activated disk to a temperature is at least 93 degrees Celsius.

8. The method of claim 1, wherein each heat activated disk comprises a preformed ring having a central opening including the following dimensions:
    an axial thickness of between 0.5 and 8 millimeters;
    an inner diameter of the central opening of between 1.3 and 13 centimeters;
    an outer diameter of the preformed ring of between 2.5 and 25 centimeters.

9. The method of claim 1, wherein a plurality of the at least one heat activated disk are placed between the ends of the two tubular filter media element segments.

10. The method of claim 9, further comprising an intermediate end cap support of a different material than the at least one heat activated disk, the intermediate end cap support comprising seating surfaces on opposite sides, each seating surface having thereon at least one heat activated disk to provide a composite intermediate end cap.

11. The method of claim 1, further comprising a sleeve of a different material than the at least one heat activated disk supporting the at least one heat activated disk for placement between the ends of the two tubular filter media element segments, and further comprising locating the sleeve over outer peripheries of the two tubular filter media element segments when placing the at least one heat activated disk between the ends of the two tubular filter media element segments.

12. The method of claim 1, further comprising arranging two support core segments for the two tubular filter media element segments, and embedding the support core segments with the two tubular filter media element segments into the at least one heat activated disk.

13. A method of manufacturing a filter element, comprising:
    arranging at least one filter media element segment in contact with at least one composite end cap, each composite end cap comprising an annular support of a first material having opposite sides and a second material along at least a first side of the opposite sides, the second material only partially covering the first side with at least one end of the at least one filter media element segment abutting the second material;
    heating the second material to soften the second material and embed the at least one filter media element segment into the second material.

14. The method of claim 13, wherein the first material comprises a plastic material and the second material is a heat-activated adhesive material, wherein the plastic material remains solid during the heating and wherein the second material is integrally bonded to the plastic material only after said arranging and from said heating.

15. The method of claim 13, wherein the first material comprises a plastic material and the second material is overmolded upon the plastic material and thereby integrally bonded to the plastic material prior to the heating.

16. The method of claim 13, wherein the annular support is in the form of an open intermediate end cap support having first and second annular seating surfaces on opposite sides and wherein the second material covers each of the first and second annular seating surfaces, and wherein the at least one filter media element segment comprises first and second pleated filter ring segments that are embedded into the second material along opposite sides of the intermediate open end cap support during the heating.

17. The method of claim 13 wherein the second material comprises at least one of an epoxy, a urethane and a hot-melt.

18. The method of claim 13, wherein the at least one composite end cap comprises at least two composite end caps in spaced relation arranged upon opposite ends of the at least one filter media element segment and simultaneously heating said at least two composite end caps to concurrently embed the at least one filter media element segment into the at least two composite end caps.

19. The method of claim 18, wherein the simultaneously heating comprises subjecting a filter assembly generated by said arranging to an oven and simultaneously curing filter media of the at least one filter media element segment during the subjecting of the filter assembly to the oven.

20. The method of claim 18, further comprising weighting a filter assembly comprising the at least one filter media element segment in contact with the at least one composite end cap to apply a force to apply an axial compressive force to the filter assembly that is at least 1 pound of force, and releasing the weighting after the at least one filter media element segment is embedded in the at least two composite end caps.

21. The method of claim 13, wherein the second material is retained upon the annular support upon arranging by a retaining means other than integral bonding of the second material, the retaining means comprising at least one of press fit, friction fit, separate adhesive other than the second material, mechanical connection, and being removably sandwiched between the support and the at least one filter media element segment.

22. A method of manufacturing a filter element, comprising:
arranging at least one filter media element segment between at least two heat activated disks with the heat activated disks in spaced relation and with the at least one filter media element segment abutting the heat activated disks;
simultaneously heating the at least two heat activated disks to concurrently embed the at least one filter media element segment into the at least two heat activated disks.

23. The method of claim 22, wherein the simultaneously heating comprises subjecting a filter assembly to an oven, the filter assembly including the at least two heat activated disks with the heat activated disks in spaced relation.

24. The method of claim 23, further comprising simultaneously curing filter media of the at least one filter media element segment during the subjecting of the filter assembly to the oven.

25. The method of claim 22, wherein the at least two heat activated disks are provided by composite end caps, each composite end cap comprising an annular support of a first material and a second material, each of the heat activated disks being of the second material, wherein during the simultaneous heating the second material is softened and the at least one filter media element segment is only embedded into the second material.

26. The method of claim 25, wherein the first material comprises a plastic material and the second material is a heat-activated material that comprises at least one of an epoxy, a urethane and a hot-melt, wherein the plastic material remains solid during the heating.

27. The method of claim 25, wherein the at least one filter media element segment comprises at least two pleated filter media ring segments arranged coaxially, and wherein the at least two heat activated disks comprise at least one intermediate disk arranged between adjacent pairs of the at least two pleated filter media ring segments and top and bottom end disks at opposite ends of a stack of the at least two pleated filter media ring segments, the top and bottom end disks providing entirely or at least in part top and bottom end caps, and the at least one intermediate disk providing an intermediate end cap with a central opening therethrough.

28. The method of claim 22, further comprising weighting a filter assembly comprising the at least one filter media element segment in contact with the at least two heat activated disks to apply a force to apply an axial compressive force to the filter assembly that is at least 1 pound of force, and removing the weighting after the at least one filter media element segment is embedded in the at least two heat activated disks.

* * * * *